United States Patent [19]

Oonishi et al.

[11] Patent Number: 5,295,125
[45] Date of Patent: Mar. 15, 1994

[54] OPTICAL HEAD DEVICE FOR RECORDING/REPRODUCTION FOR RECORDING MEDIUM USING PLURAL LIGHT SPOTS

[75] Inventors: Kunikazu Oonishi, Chigasaki; Tohru Sasaki; Masayuki Inoue, both of Yokohama; Yasuo Kitada; Akira Saito, both of Odawara, all of Japan

[73] Assignee: Hitachi, Ltd., Tokyo, Japan

[21] Appl. No.: 12,404

[22] Filed: Feb. 2, 1993

[30] Foreign Application Priority Data

Feb. 3, 1992 [JP] Japan .................................. 4-046360

[51] Int. Cl.$^5$ ............................................. G11B 7/095
[52] U.S. Cl. ................................. 369/44.29; 369/44.37; 369/58
[58] Field of Search ................ 369/44.23, 44.24, 44.27, 369/44.29, 44.31, 44.32, 44.33, 44.35, 44.37–44.38, 53–54, 58, 109–112, 121

[56] References Cited

U.S. PATENT DOCUMENTS

| | | | |
|---|---|---|---|
| 4,549,287 | 10/1985 | Hatano et al. | 369/44.23 X |
| 4,841,510 | 6/1989 | Yoshizawa | 369/44.23 |
| 5,042,020 | 8/1991 | Endo | 369/58 X |
| 5,097,464 | 3/1992 | Nishiuchi et al. | 369/44.24 X |
| 5,235,581 | 8/1993 | Miyagawa et al. | 369/58 X |

FOREIGN PATENT DOCUMENTS 62-59375 12/1987 Japan .

Primary Examiner—W. R. Young
Attorney, Agent, or Firm—Fay, Sharpe, Beall, Fagan, Minnich & McKee

[57] ABSTRACT

There is disclosed an optical head device in which at least two laser beams having different wavelengths are converged as light spots on a recording medium or optical disk by use of one objective lens and one of the two laser beams is subjected to a focusing control while the recording or reproduction of a signal on or from the optical disk is made using the other laser beam. When the one laser beam is subjected to the focusing control, the deviation of a converging position of the other laser beam for the optical disk may occur due to a difference in refractive index between transparent substrates of plural kinds of optical disks. In such a case, the converging position of the other laser beam is displaced to cancel the amount of deviation.

9 Claims, 8 Drawing Sheets

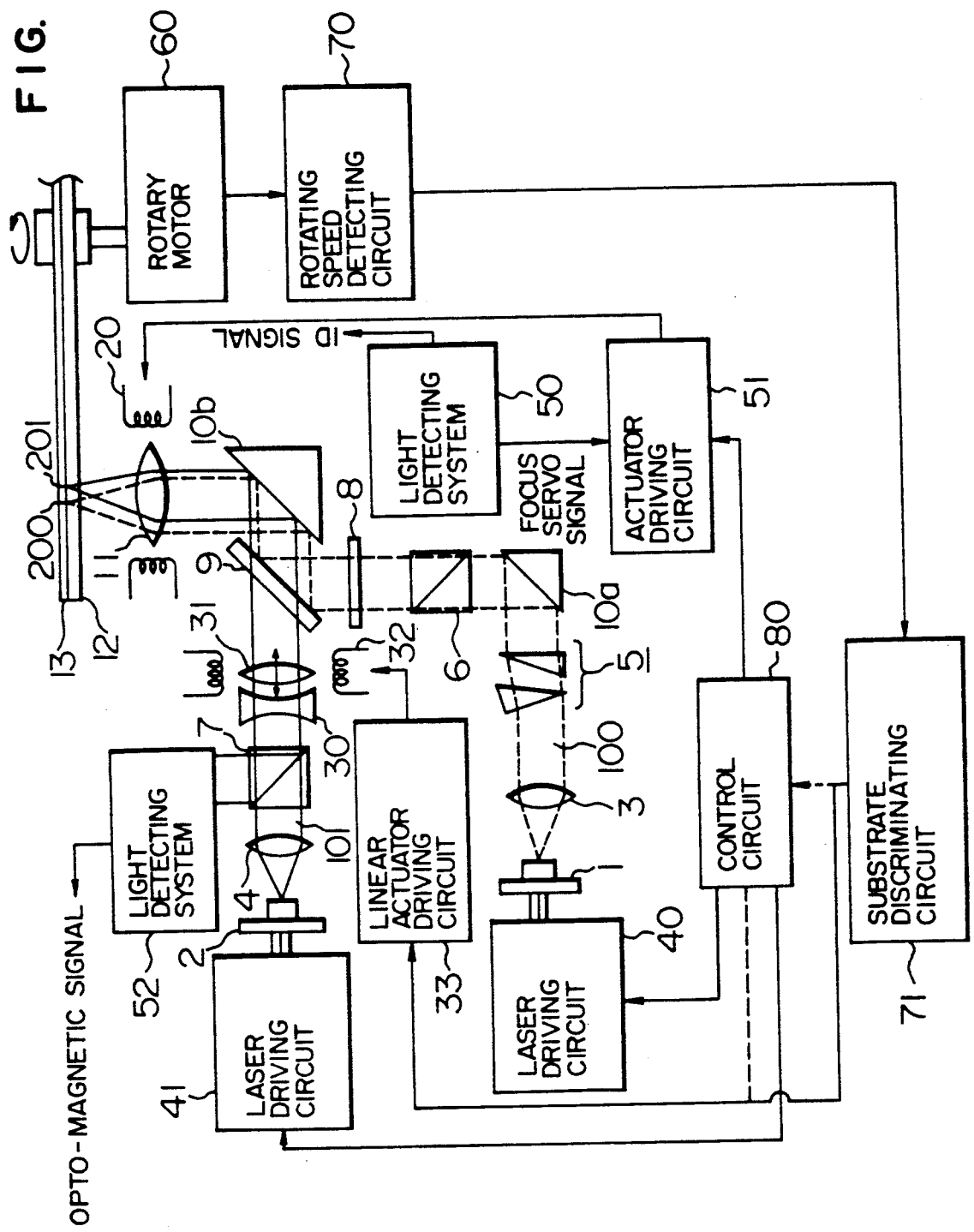

OPTICAL HEAD DEVICE FOR RECORDING/REPRODUCTION FOR RECORDING MEDIUM USING PLURAL LIGHT SPOTS

BACKGROUND OF THE INVENTION

The present invention relates to an optical head device in which the signal recording, reproduction, erasion or the like for a disk-like optical information recording medium or magneto-optical information recording medium (hereinafter referred to as optical disk for simplicity) is made using a plurality of light spots. More particularly, there is an optical head in which a plurality of light spots including, for example, a recording light spot and a reproducing light spot are used together. In a certain type of such optical head, laser beams having different wavelengths are respectively used for the plurality of light spots, for example, with first and second laser beams of different wavelengths $\lambda_1$ and $\lambda_2$ being used for the recording and reproducing light spots, and those laser beams can be detected separately from each other with respect to the wavelengths. The present invention relates to such an optical head device using a plurality of light spots.

As an optical head using a plurality of light spots having different wavelengths, there has hitherto been known an optical head in which one objective lens is used commonly to the plurality of light spots and the light spots are converged on an optical disk by the one or same objective lens, as disclosed by, for example, In such a conventional optical head, only one specified light spot, that is, one of two light spots actually used is subjected to an irradiation position control (or focusing control) for focusing a light beam as a light spot on an optical disk to irradiate the optical disk with the light spot while the other of the two light spots is caused to follow the one light spot, thereby simplifying an optical system and a mechanical system for focusing control. In this connection, there are the case where two light spots are both maintained in focused conditions and the case where one of two light spots is maintained in a focused condition and the other light spot is maintained in a defocused condition as required.

More particularly explaining, the focusing control is made in regard to a certain specified light spot in such a manner that a focusing error is detected from a light beam of the specified light spot reflected from the optical disk and the distance of the objective lens relative to the optical disk is controlled so that the focusing error becomes zero. Since the objective lens thus controlled is used for the other light spot too, there results in that the other light spot follows the specified light spot subjected to the focusing control though the other light spot itself is not directly subjected to the focusing control.

In such a conventional optical head, it is required that all of light spots having different wavelengths should be converged on the same recording surface of an optical disk by use of a common objective lens. For that purpose, an achromatic lens free of a change in focal distance attendant upon a change in wavelength or a chromatic aberration is used as the objective lens.

However, such an achromatic objective lens is designed on the premise that a substrate of the optical disk irradiated with a light beam through the achromatic objective lens is made of a specified material (for example, glass). An optical disk is a recording medium which is composed of a transparent substrate and a recording film provided on the surface of the substrate. A light beam is converged on a recording surface of the recording film through the transparent substrate. Therefore, if the substrate material of an optical disk actually used is different from a specified substrate material used upon design of the achromatic objective lens, there results in that the characteristic of a change in refractive index for different wavelengths of incident light beams, for example, $\lambda_1$ and $\lambda_2$ (hereinafter referred to as refractive index versus wavelength characteristic for simplicity) is different between the actually used substrate and the specified substrate used upon design.

Accordingly, even if the distance of the objective lens relative the optical disk is controlled by subjecting a light spot of wavelength $\lambda_1$ to a focusing control in the case where an optical disk made of a substrate material other than a specified material (for example, glass) is used, there does not result in that a light spot of wavelength $\lambda_2$ follows the light spot of wavelength $\lambda_1$ subjected to the focusing control. Namely, the focus positions of the light spots of wavelengths $\lambda_1$ and $\lambda_2$ (or the converging position thereof in the case where it is required that the light spot should be maintained in a defocused condition) deviate from each other in the direction of an optical axis.

Now consider the case where an achromatic objective lens designed to converge light spots of different wavelengths in the same recording plane is used for a disk substrate of thickness t having a refractive index versus wavelength characteristic in which the refractive index is $n_1$ for light of wavelength $\lambda_1$ and $n_2$ for light of wavelength $\lambda_2$. If the refractive index of a disk substrate actually used is $(n_1 + \Delta n_1)$ for light of wavelength $\lambda_1$ and $(n_2 + \Delta n_2)$ for light of wavelength $\lambda_2$, the light spot of wavelength $\lambda_1$ and the light spot of wavelength $\lambda_2$ deviate from each other in focus position by a distance $\delta$ approximately represented by the following equation:

$$\delta = \{\Delta n_1/n_1(n_1+\Delta n_1) - \Delta n_2/n_2(n_2+\Delta n_2)\} \cdot t \quad (1)$$

By way of example, FIG. 2 shows the refractive index versus wavelength characteristics of glass and polycarbonate resin which are generally used as the substrate material of an optical disk. For example, consider the case where an achromatic objective lens is designed to exhibit the optimum achromatic characteristic when the beam wavelengths $\lambda_1$ and $\lambda_2$ of semiconductor lasers employed in a two-laser optical head using two light spots are 780 nm and 680 nm and a disk substrate material is glass. In such a case, if the achromatic objective lens thus designed is used in an optical disk using polycarbonate resin as a disk substrate material, it becomes apparent from the characteristic diagram shown in FIG. 2 and the equation (1) that a relative deviation larger than about 1 $\mu$m occurs between the converging positions of the two light spots.

Therefore, when one of the two light spots is converged on a recording surface of the optical disk by a focusing control, the other light spot is remarkably defocused, thereby remarkably deteriorating the performance of the optical head. In order to avoid such a problem, it is required for the conventional optical head device using a plurality of light spots that an optical disk capable of being used should be limited to one in which a specified substrate material is used. However, this requirement provides a great problem in the aspect of generality.

SUMMARY OF THE INVENTION

An object of the present invention relating to an optical head device in which the recording or reproduction of a signal on or from a recording medium is made using a plurality of light spots or an optical head device in which at least two light spots having different wavelengths are converged on an optical disk by one objective lens, is to provide an improved optical head device which can reduce a relative positional deviation between the converging or focus positions of the light spots which may occur in the case where an optical disk used is changed from one using a specified substrate material having a refractive index versus wavelength characteristic to another one having a refractive index versus wavelength characteristic different from the specified substrate, thereby making it possible for the light spots to take the same converging or focus condition irrespective of a difference in substrate material used.

To achieve the above object, an optical head device of the present invention comprising a first semiconductor laser source for emitting a first laser beam having a wavelength $\lambda_1$, a second semiconductor laser source for emitting a second laser beam having a wavelength $\lambda_2$ different from the wavelength $\lambda_1$, one objective lens used commonly to the first and second laser beams, and a focusing control system for converging one of the first and second laser beams as a light spot on a recording surface further comprises recording medium discriminating means for discriminating and detecting a substrate material which forms a recording medium, and light spot displacing means for displacing, when the other of the first and second laser beams subjected to no focusing control is used, the focus position of a light spot of the other laser beam in a direction in which a deviation in focus position between the one laser beam and the other laser beam caused by the difference in substrate material is cancelled.

With the above construction including the provision of the recording medium material discriminating means and the light spot displacing means, it is possible to detect a difference of the substrate material of a used optical disk from a predetermined one, if any, and to cancel the deviation of the converging or focus position which may be caused by a difference in wavelength between the light spots used.

BRIEF DESCRIPTION OF THE DRAWINGS

FIG. 7 is a block diagram of an optical head device according to a second embodiment of the present invention.

DESCRIPTION OF THE PREFERRED EMBODIMENTS

Figure 1:
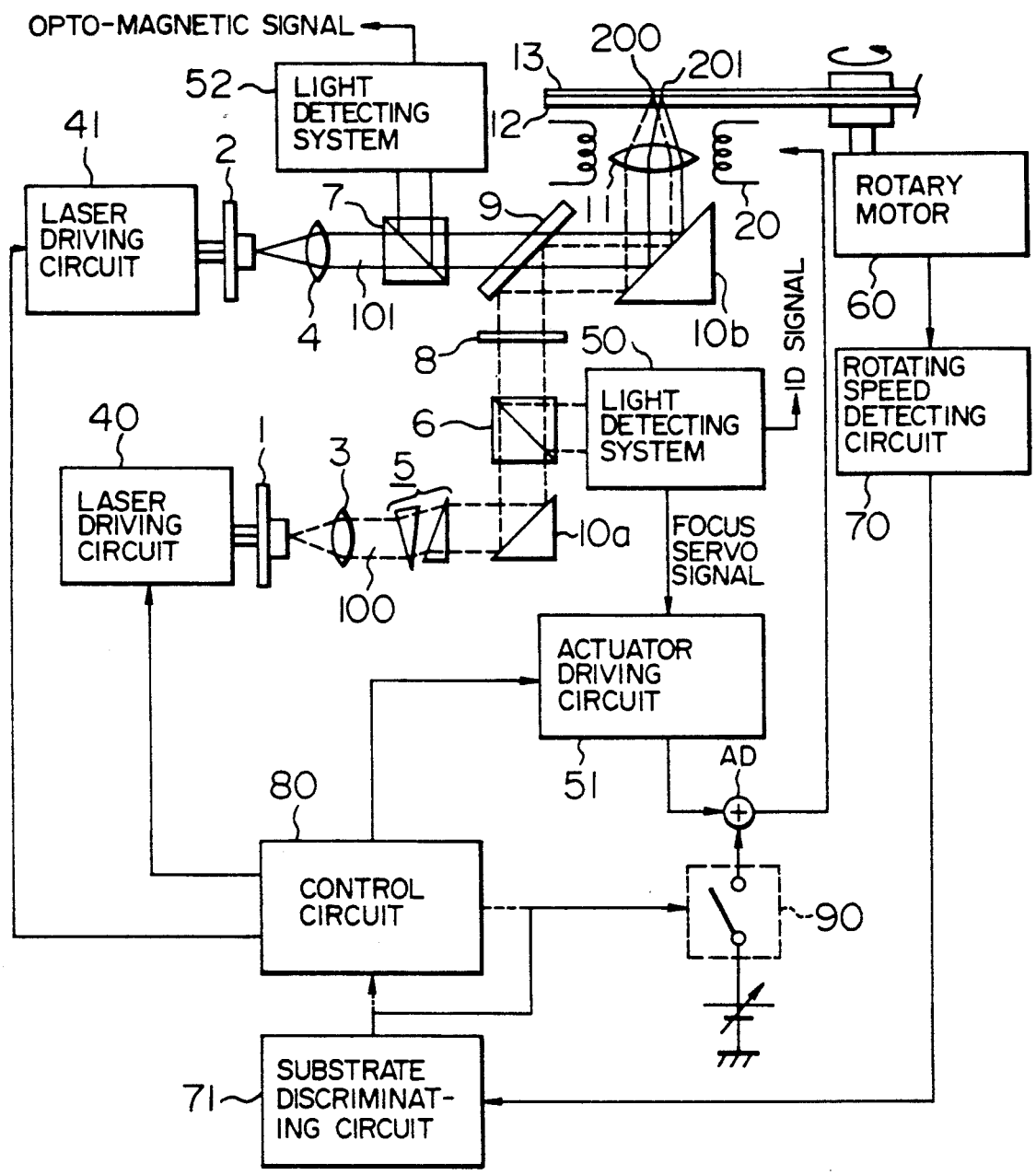
FIG. 1 is a block diagram of an optical head device according to a first embodiment of the present invention.
Figure 2:
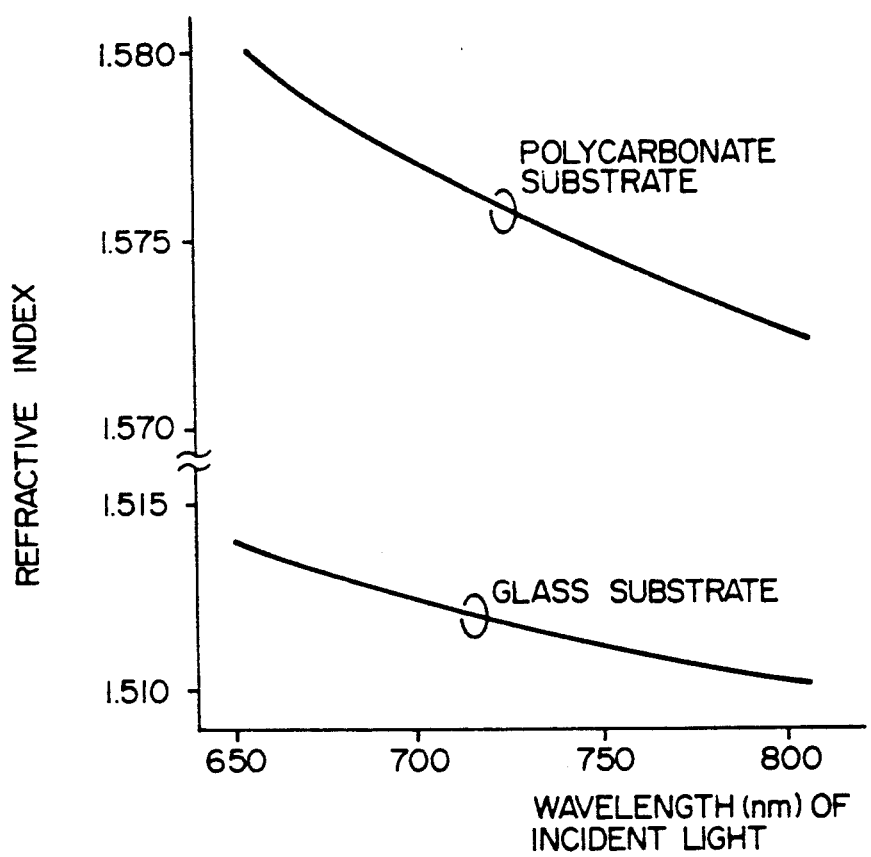
FIG. 2 is a characteristic diagram showing examples of the refractive index versus wavelength characteristic of an optical disk substrate.

FIG. 1 is a block diagram of an optical head device according to a first embodiment of the present invention. In the figure, reference numeral 1 designates a semiconductor laser source for emitting a laser beam having a wavelength of, for example, 780 nm, and numeral 2 designates a semiconductor laser source for emitting a laser beam having a wavelength of, for example, 680 nm. Numerals 40 and 41 designate laser driving circuits for driving the semiconductor laser sources 1 and 2, respectively.

A laser beam emitted from the semiconductor laser source 1 is converted by a collimator lens 3 into a collimated beam 100, is thereafter passed through a beam shaping prism 5 for shaping the beam in cross section from an elliptic form at a laser beam emitting position into a circular form, an optical path deflecting mirror 10a, a polarized beam splitter 6 for transmitting P waves and reflecting S waves, and a quarter wavelength plate 8 for rotating the plane of polarization of light by 45°, and then impinges upon a wavelength separating filter 9 for reflecting a light beam having one of two wavelengths (or 780 nm) and transmitting a light beam having the other wavelength (or 680 nm). On the other hand, a laser beam emitted from the semiconductor laser source 2 is converted by a collimator lens 4 into a collimated beam 101 and is thereafter converted by a polarizer 7 into a linearly polarized beam which in turn impinges upon the wavelength separating filter 9.

Since the wavelength separating filter 9 has an optical characteristic of reflecting the light beam 100 of wavelength 780 nm and transmitting the light beam 101 of wavelength 680 nm, the light beams 100 and 101 trace substantially the same optical path from the wavelength separating filter 9 and enter an objective lens 11 through an optical path deflecting mirror 10b. The objective lens 11 converges the light beams 100 and 101 into light spots 200 and 201 with which a recording surface 13 of an optical disk to be recorded with an opto-magnetic signal is irradiated through a substrate 12 of the optical disk.

A reflected beam of the light spot 200 from the optical disk recording surface 13 passes through the objective lens 11 again, retraces the same optical path as the incident light beam 100, and enters the quarter wavelength plate 8. As a result, the light beam goes and returns the quarter wavelength plate 8 so that the light beam becomes a light beam having a plane of polarization thereof rotated by 90° while going and returning. The polarization plane rotated light beam is reflected by the polarized beam splitter 6 and enters a light detecting system 50.

The light detecting system 50 includes predetermined optical parts, a light detector and an electric circuit. The light detecting system 50 detects a signal for control of an irradiation position of the light spot 200 in the direction of an optical axis (hereinafter referred to as focus servo signal for simplicity) by use of known detecting means such as an astigmatism system. The light detecting system 50 further detects a signal for control of an irradiation position of the light spot 200 in a direction in a plane of the optical disk recording surface (hereinafter referred to as tracking servo signal for simplicity), an address information signal (or ID signal) beforehand recorded by phase pits or the like on the recording surface 13, and so on. Since the specific construction of such a light detecting system is known, explanation thereof will be omitted.

The focus servo signal detected by the light detecting system 50 is supplied to an actuator driving circuit 51. An output signal of the actuator driving circuit 51 is supplied to an objective lens actuator 20 to control the position of the objective lens 11 in the optical-axis direction so that the light spot 200 is correctly focused on the optical disk recording surface 13.

The actuator driving circuit 51 and the laser driving circuits 40 and 41 are controlled by a known control circuit 80. Similarly to the focus servo signal, the tracking servo signal too is supplied to the actuator driving circuit 51 so that the position of the light spot 200 in the in-plane direction of the optical disk recording surface 13 is controlled on the basis of the tracking servo signal. Since these techniques are known, detailed explanation thereof will be omitted.

On the other hand, the light spot 201 is converged by the objective lens 11 in a manner similar to the light spot 200. Therefore, the light spot 201 impinges on the optical disk recording surface 11 while following the displacement of the light spot 200. A reflected beam of the light spot 201 from the optical disk recording surface 13 also passes through the objective lens 11 again and retraces the same optical path as the incident light beam 101. A part of the light beam is reflected by the polarizer 7 and then enters a light detecting system 52.

The light detecting system 52 too includes predetermined optical parts, a light detector and an electric circuit. By use of known detecting means, the light detecting system 52 detects an information signal such as an opto-magnetic signal recorded on the optical disk. Since the specific construction of such a light detecting system is known, explanation thereof will be omitted.

Figure 3A:
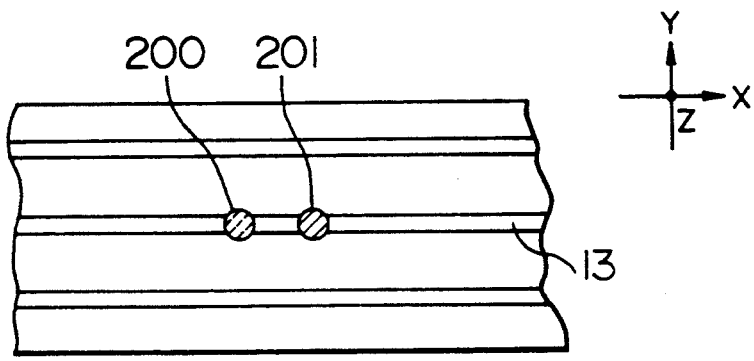
FIGS. 3A and 3B are a plan view and a side view showing a state in which two light spots are converged on the same recording surface.
Figure 3B:
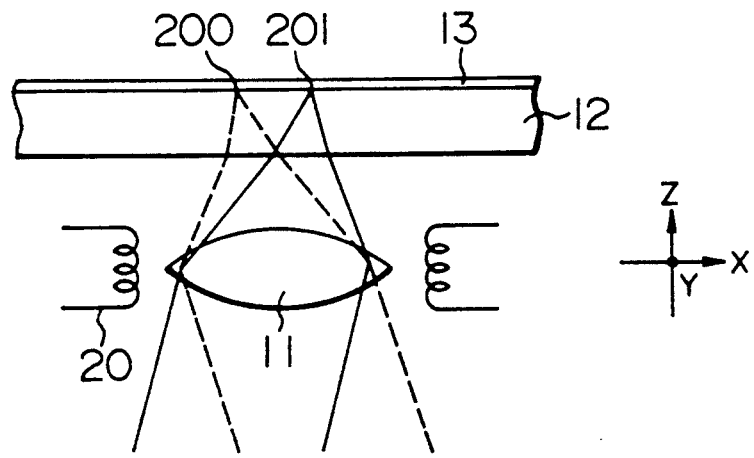

In an optical head having a construction in which two or more light beams having different wavelengths are converged by one objective lens, as in the embodiment shown in FIG. 1, an achromatic lens is generally used as the objective lens, as has already been mentioned. Accordingly, for an optical disk including a substrate having a predetermined refractive index versus wavelength characteristic, the objective lens 11 can make the focus positions of the light spots 200 and 201 coincident with each other on the optical disk recording surface 13, as shown in FIGS. 3A and 3B. FIGS. 3A and 3B are views for showing that the light spots of two light beams having different wavelengths are focused on the same optical disk recording surface in the case where an optical disk including a substrate having a predetermined refractive index versus wavelength characteristic is used.

Figure 4A:
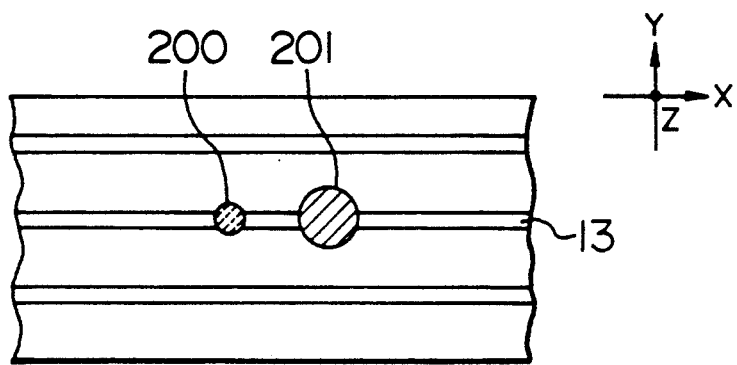
FIGS. 4A and 4B are a plan view and a side view showing a state in which one of the two light spots is converged on the recording surface and the other light spot is defocused.
Figure 4B:
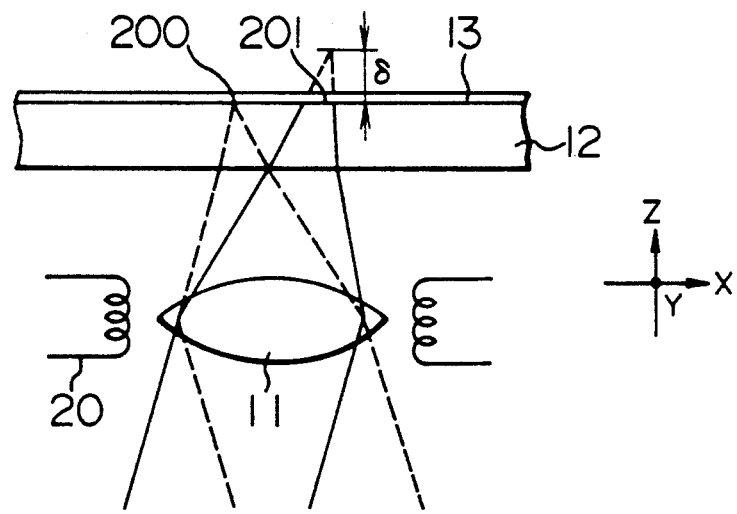
Figure 5A:
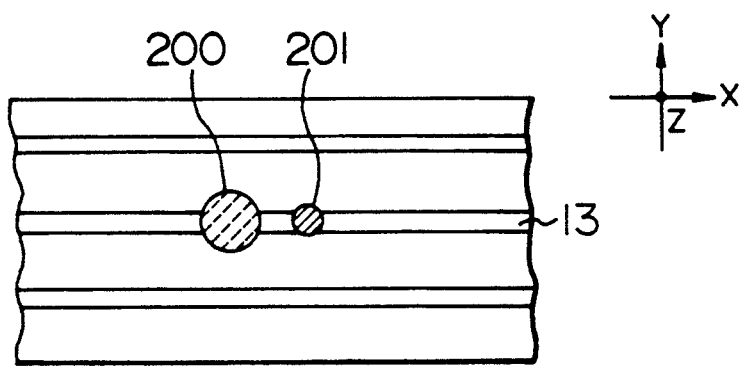
FIGS. 5A and 5B are a plan view and a side view showing a state in which the other light spot is converged on the recording surface and the one light spot is defocused in a reverse direction.
Figure 5B:
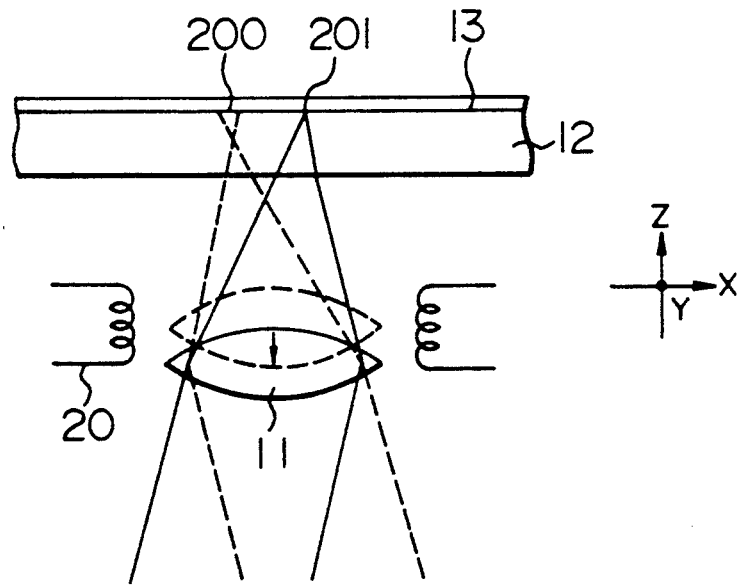

However, in the case where the material of the disk substrate 12 is changed to a material having a different refraction index versus wavelength characteristic, there occurs a relative positional deviation between the two light spots in the direction of the optical axis of the objective lens, as mentioned above. At this time, the light spot 200 is focus-controlled by the focus servo signal so that the light spot 200 is always and correctly converged on the optical disk recording surface 13 whereas the light spot 201 subjected to no focusing control impinges upon the optical disk recording surface 13 in a condition in which it is defocused by a distance corresponding to the amount 6 of relative positional deviation between the light spots 200 and 201, as shown in FIGS. 4A and 4B.

Accordingly, if the signal recording, reproduction, erasion or the like is made using the light spot 201, the performance of the optical head is remarkably deteriorated since the light spot 201 is in the defocused condition. Thus, in the case where the relative positional deviation between the light spots 200 and 201 in the optical-axis direction occurs with the change of a refractive index versus wavelength characteristic of the optical disk substrate or the change to a different kind of optical disk and the signal recording, reproduction, erasion or the like is made by the light spot 201 which is not subjected to an irradiation position control or focusing control, the following is carried out.

Namely, a predetermined offset current is added by an adder circuit AD (see FIG. 1) to an actuator driving current supplied from the actuator driving circuit 51 to the objective lens actuator 20 for the focusing control so that the objective lens 11 is displaced from its controlled position in a reverse direction along the optical axis by a distance which corresponds to the amount δ of relative positional deviation between the two light spots. That is, the actuator driving circuit 51 outputs a signal for driving the objective lens actuator 20 so that the movement of the objective lens 11 in the optical-axis direction is stopped at a position at which an input signal to the objective lens actuator 20 becomes zero. Accordingly, this focusing servo system operates so that the input signal to the objective lens actuator 20 becomes zero always. When the offset current is added to such a focusing servo system through the adder circuit AD, the servo system operates so that the value of the sum of the output of the actuator driving circuit 51 and the offset current becomes zero. As a result, a light spot subjected to the focusing control is defocused by the distance corresponding to the offset current.

In FIG. 1, the adder circuit AD is provided on the output side of the actuator driving circuit 51. However, it can be understood from the foregoing explanation that the adder circuit may be provided at any circuit position between the light detecting system 50 and the objective lens actuator 20.

Thus, the light spot 201 subjected to no focusing control and used for the signal recording, reproduction, erasion or the like can correctly be converged on the optical disk recording surface 13. On the other hand, the light spot 200 subjected to the focusing control is defocused in the reverse direction. In this case, however, no problem arises since the light spot 200 is not used for the signal recording, reproduction, erasion or the like.

The above-mentioned amount δ of relative positional deviation between light spots is a value which is uniquely determined by a refractive index versus wavelength characteristic of the optical disk substrate material. Accordingly, for each of substrate materials which may become the object of use (the substrate materials have different refractive index versus wavelength characteristics from each other), the amount of relative positional deviation between light spots is beforehand determined using, for example, the equation (1) shown above. And, an offset current to be added to a primary actuator driving current for a focusing control is set or determined from the determined value of deviation.

In the present embodiment shown in FIG. 1, the material of the disk substrate 12 is discriminated by a substrate discriminating circuit 71 which will be explained later on. A switch 90 is changed over on the result of discrimination to turn the offset current on or off. Namely, in the case where the material of the disk substrate 12 has a refractive index versus wavelength characteristic causing a relative positional deviation between the two light spots 200 and 201 and the signal recording, reproduction, erasion or the like is made using the light spot 201 which is not subjected to the focusing control, the switch 90 is turned on to add the offset current to the actuator driving current, thereby displacing the objective lens 11 so that the light spot 201 is correctly converged on the optical disk recording surface 13.

To the contrary, in the case where the material of the disk substrate 12 is a material causing no relative positional deviation between the two light spots 200 and 201 or in the case where the signal recording, reproduction, erasion or the like is made using the light spot 200 subjected to the focusing control even if the material of the disk substrate 12 is a material causing a relative positional deviation between the two light spots 200 and 201, the switch 90 is turned off so that no offset current is added.

With the provision of the above means, a light spot used for the signal recording, reproduction, erasion or the like can automatically be converged on a recording surface of an optical disk even if the disk substrate is changed. As shown by dotted line in FIG. 1, the output of the substrate discriminating circuit 71 may be supplied to the control circuit 80 so that the control circuit 80 turns the switch 90 on or off.

As the substrate discriminating circuit 71 can be employed means which will be mentioned in the following. Optical disk substrates generally used at the present time are remarkably different in refractive index versus wavelength characteristic as well as specific gravity, depending on the substrate material. For example, in the case of glass and polycarbonate resin for disk substrate shown in the above example, the specific gravity of glass is about 2.5 whereas the specific gravity of polycarbonate resin is about 1.2 which is smaller than a half of that of glass.

Accordingly, in the case where optical disks having the same configuration are formed using glass and polycarbonate as substrate materials, the moment of inertia of the optical disk using glass is smaller that a half of that of the optical disk using polycarbonate resin. If such optical disks having remarkably different moments of inertia are rotated or driven by a rotary motor 60 having a fixed torque, a remarkable difference occurs also in a time required until each disk reaches a predetermined rotating speed.

Figure 6:
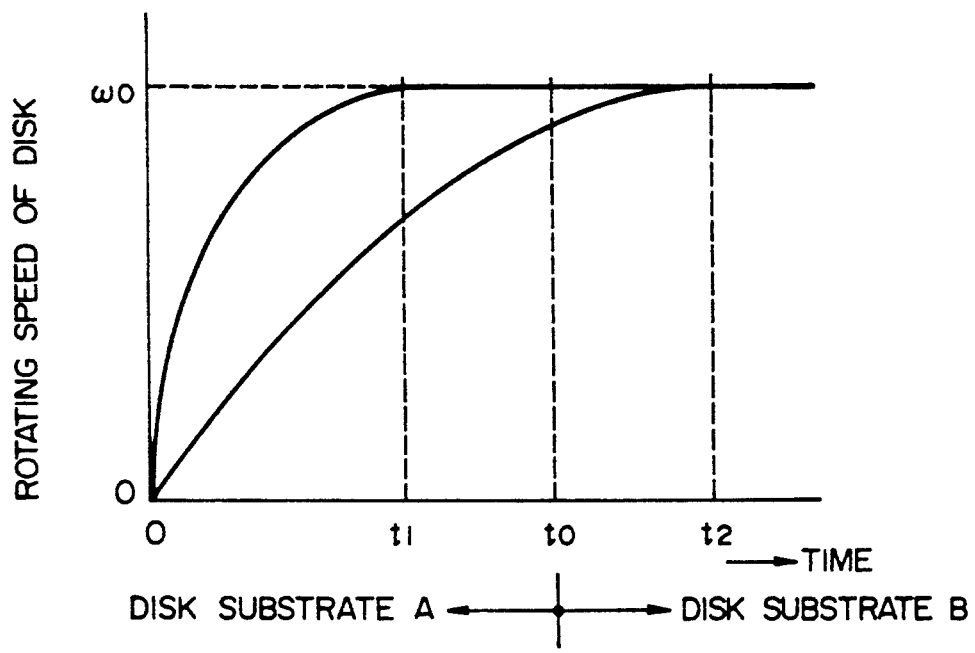
FIG. 6 is a characteristic diagram showing the principle of a specific example of substrate discriminating means used in the present invention.

Thus, the embodiment shown in FIG. 1 includes, as substrate discriminating means, a known rotating speed detecting system or circuit 70 which detects the rotating speed of the optical disk on the basis of an output signal of the rotary motor 60 concerning the rotating speed, and the substrate discriminating circuit 71 which detects, a time $t_1$ or $t_2$ required from the start of rotation of the optical disk until the disk reaches a predetermined rotating speed $\omega_0$, on the basis of an output signal of the rotating speed detecting circuit 70 to discriminate the material of the disk substrate in accordance with whether the detected time $t_1$ or $t_2$ is longer or shorter than a predetermined reference time $t_0$, that is, whether a time difference from the reference time $t_0$ is positive or negative (see FIG. 6). The substrate discriminating circuit 71 is provided with a timer which starts the timing operation upon start of the rotation of the motor 60 and stops the timing operation when the predetermined rotating speed is reached or detected.

FIG. 6 is a characteristic diagram having the ordinate along which the rotating speed of the optical disk is taken and the abscissa along which a time required from the start of rotation of the optical disk until the disk reaches the predetermined rotating speed $\omega_0$ is taken for each disk substrate material ($t_1$ for a disk substrate A and $t_2$ for a disk substrate B).

The construction of the embodiment of FIG. 1, in which the offset current is turned on and off, can cope with two kinds of disk substrate materials. However, it is also possible to cope with three or more kinds of substrate materials if the value of the offset current to be added to the actuator driving current is beforehand set for each of the three or more substrate materials and there is employed a construction in which one of those offset current values is selected by the substrate discriminating circuit so that the selected offset current value is added to the actuator driving current.

In the present embodiment, the tracking servo signal for the light spots 200 and 201 too is obtained from reflected light of the light spot 200 in a manner similar to that in the case of the focus servo signal, as mentioned above. However, in the case where a relative positional deviation occurs between the light spots 200 and 201 and the light spot 201 is focused on the optical disk recording surface 13 by such light spot displacing means as mentioned above, the light spot 200 impinges upon the optical disk recording surface 13 in a relatively defocused form. As a result, there may be a possibility that the degree of modulation of the tracking servo signal obtained becomes insufficient. In order to avoid such a problem, there can be considered a construction in which a known tracking servo signal detecting system is provided so as to enable the detection of a tracking servo signal also from reflected light of the light spot 201 and a light spot control is made with a changeover to the tracking servo signal obtained from the light spot 201 in the case where the degree of modulation of the tracking servo signal obtained from the light spot 200 is not sufficient.

FIG. 7 shows a block diagram of an optical head device according to a second embodiment of the present invention. In FIG. 7, the same components as those used in the first embodiment of FIG. 1 are designated by the same reference numerals as those used in FIG. 1. The construction of the present embodiment shown in FIG. 7 is similar to that of the first embodiment shown in FIG. 1. In the present embodiment, however, a lens system including the combination of a concave lens 30 and a convex lens 31 is inserted in an optical path of a light beam 101 between a collimator lens 4 and a wavelength separating filter 9.

Further, one of the lenses 30 and 31 (or the convex lens 31 in the embodiment FIG. 7) is provided with a linear actuator 32 for displacing the one lens in an optical-axis direction and a linear actuator driving circuit 33 so that a distance between the two lenses can be changed by a predetermined value.

When the distance between the lenses is changed, a collimated condition of the light beam 101 is changed so that the light beam 101 enters an objective lens 11 in the form of a convergent beam or in the form of a divergent beam. As a result, a light spot 201 is displaced by a predetermined distance in the optical-axis direction. For example, provided that the focal distance of the objective lens 11 is $f_0$, the focal distance of the concave lens 30 is $-f_d$, the focal distance of the convex lens 31 is $(f_d+w)$ and the distance between the lenses 30 and 31 in an initial state is w ($f_d >> w$) a relationship between the amount $\delta_w$ of small change of the distance between the lenses 30 and 31 and the amount $\delta_\epsilon$ of displacement of the light spot 201 in the optical-axis direction is approximately represented by the following equation:

$$\delta = (f_0^2/f_d^2)\cdot\delta_w \quad (2)$$

Figure 8A:
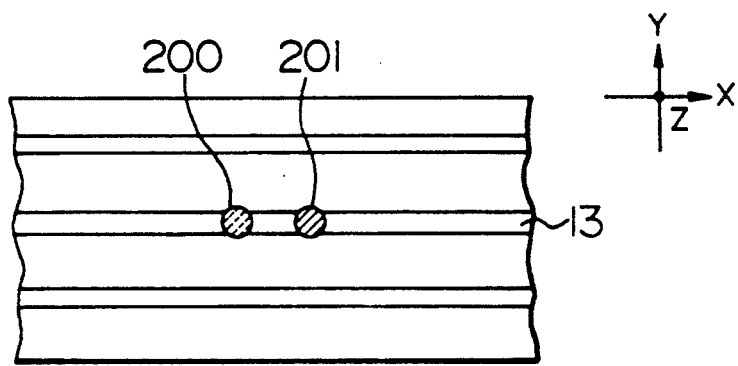
FIGS. 8A and 8B are a plan view and a side view showing, in conjunction with the second embodiment of the present invention, a state in which two light spots are converged on the same recording surface.
Figure 8B:
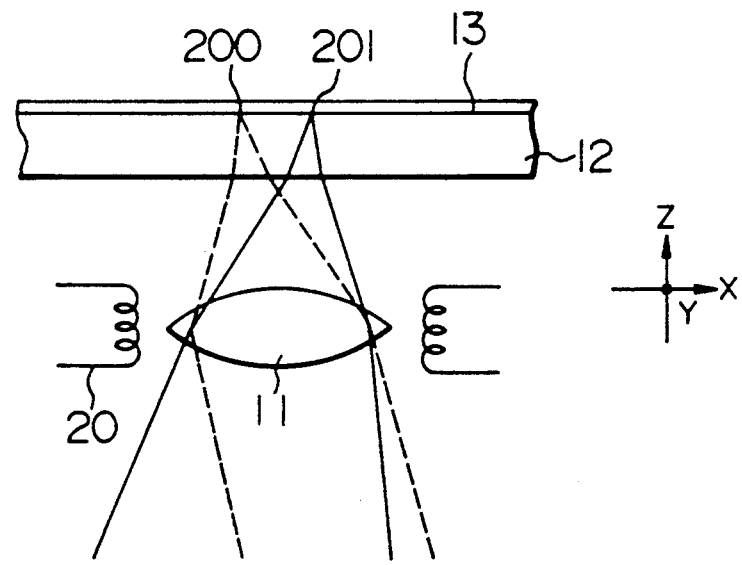

By using such an optical property, it is possible to displace the light spot 201 so that a relative positional deviation between a light spot 200 and the light spot 201 caused by a difference in disk substrate material is cancelled. As a result, both of the light spots 200 and 201 can be converged on an optical disk recording surface 13, as shown in FIGS. 8A and 8B.

According to the present embodiment, it is possible to converge two light spots on the same recording surface of an optical disk always and correctly even in the case where a relative positional deviation between the two light spots occurs is caused by a difference in refractive index versus wavelength characteristic between substrates. Consequently, a function such as a RAW (Read After Write) function of making the signal recording, reproduction, erasion or the like with two light spots being simultaneously used can be realized irrespective of the kind of a substrate material used.

In the present embodiment too, a substrate discriminating circuit 71 is provided, as in the first embodiment and as shown in FIG. 7, to control the linear actuator driving circuit 33, thereby making it possible to automatically drive the linear actuator 32 on the basis of the result of discrimination by the substrate discriminating circuit 71 to cancel a relative positional deviation between the two spots 200 and 201. The linear actuator driving circuit 33 may be controlled through a control circuit 80, as shown by dotted line in FIG. 7.

Also, in the present embodiment, the lens system including the combination of the concave and convex lenses 30 and 31 is used as the light spot displacing means. However, it is of course that an optical system having any construction may be used so long as it can displace light spots independently from each other in the optical-axis direction.

Further, in the present embodiment, the light spot displacing means is provided only in the optical path of the light beam 101. However, similar light spot displacing means may be provided also in the optical path of a light beam 100 so that the light spots 200 and 201 can be converged on the same recording surface by displacing both the light spots 200 and 201 in a direction in which they approach to each other and by a distance which corresponds to a half of the amount of relative positional deviation between the light spots 200 and 201.

According to the present invention as mentioned above, even in the case where a relative positional deviation in the direction of an optical axis between two light spots having different wavelengths may be caused by a difference in optical disk substrate material in an optical head in which an optical disk is irradiated with both the two light spots through one objective lens, at least one of the two light spots used for the recording, reproduction or erasion of a signal can be converged on a recording surface of the optical disk without being defocused and with a simple construction. As a result, it is possible to greatly diminish the deterioration of the performance of the optical head which may be caused by the difference in optical disk substrate material.

We claim:

1. An optical head device in which the recording on or reproduction from a recording medium having a recording film on a surface of a transparent substrate is made using a plurality of light spots, comprising:
   a first laser source for emitting a first laser beam having a wavelength $\lambda_1$;
   a second laser source for emitting a second laser beam having a wavelength $\lambda_2$ different from the wavelength $\lambda_1$;
   one objective lens used commonly to said first and second laser beams to converge said first and second laser beams on a recording surface of the recording film of said recording medium through said transparent substrate;
   a focusing control system for moving said objective lens in the direction of an optical direction to focus said first laser beam as a light spot on said recording surface;
   recording medium discriminating means for discriminating plural kinds of recording mediums having transparent substrates which have different refractive indices, respectively; and
   light spot displacing means for displacing, when at least one of said plural kinds of recording mediums is discriminated by said recording medium discriminating means, a light spot position of said second laser beam in a direction in which the amount of deviation of the light spot position of said second laser beam on the recording surface in the optical-axis direction caused by a difference of the refractive index of the discriminated recording medium from that of another recording medium is cancelled.

2. An optical head device according to claim 1, wherein said light spot displacing means operates only when said second laser beam is used for the recording or reproduction of a signal.

3. An optical head device according to claim 1, wherein said focusing control system includes focus error signal detecting means for detecting a focus error signal on a reflected version of said first laser beam from said recording medium, and an actuator for moving said objective lens in the optical-axis direction so that said focus error signal becomes zero.

4. An optical head device according to claim 3, wherein said light spot displacing means includes an offset signal source for generating an offset signal corresponding to said amount of deviation, and offset signal supplying means for supplying the offset signal from said offset signal source to said actuator to cancel said amount of deviation.

5. An optical head device according to claim 4, wherein said offset signal source includes means for generating said offset signal which has a predetermined amplitude corresponding to said amount of deviation.

6. An optical head device according to claim 4, wherein said offset signal supplying means includes switch means which is turned on to output the offset signal from offset signal source in accordance with a discrimination signal from said recording medium discriminating means, and adder means for supplying the offset signal from said offset signal source to said actuator to add the same to said focus error signal.

7. An optical head device according to claim 1, wherein said light spot displacing means includes a light spot displacing lens system having at least one lens arranged in a path of said second laser beam, and lens displacing means for displacing the lens of said light spot displacing lens system in the optical-axis direction on the basis of a discrimination signal from said recording medium discriminating means.

8. An optical head device according to claim 1, wherein said recording medium discriminating means includes rotating speed detecting means for detecting the rotating speed of a motor which has a predetermined torque for driving said recording medium, and substrate discriminating means for discriminating the kind of said recording medium on the basis of a time required from the start of the driving of said recording medium by said motor until said motor reaches a predetermined rotating speed.

9. An optical head device according to claim 1, wherein said first and second laser sources include semiconductor lasers.

* * * * *